(12) United States Patent
Akamine

(10) Patent No.: US 12,487,600 B2
(45) Date of Patent: Dec. 2, 2025

(54) AUTONOMOUS TRAVEL SYSTEM, AUTONOMOUS TRAVEL METHOD, AND AUTONOMOUS TRAVEL PROGRAM

(71) Applicant: Yanmar Holdings Co., Ltd., Osaka (JP)

(72) Inventor: Shiro Akamine, Osaka (JP)

(73) Assignee: Yanmar Holdings Co., Ltd., Osaka (JP)

( * ) Notice: Subject to any disclaimer, the term of this patent is extended or adjusted under 35 U.S.C. 154(b) by 257 days.

(21) Appl. No.: 18/035,114

(22) PCT Filed: Oct. 21, 2021

(86) PCT No.: PCT/JP2021/038858
§ 371 (c)(1),
(2) Date: May 3, 2023

(87) PCT Pub. No.: WO2022/102365
PCT Pub. Date: May 19, 2022

(65) Prior Publication Data
US 2024/0004396 A1 Jan. 4, 2024

(30) Foreign Application Priority Data
Nov. 12, 2020 (JP) .................. 2020-188654

(51) Int. Cl.
*G05D 1/648* (2024.01)
*A01B 79/00* (2006.01)
*G05D 1/00* (2006.01)

(52) U.S. Cl.
CPC ......... *G05D 1/0219* (2013.01); *A01B 79/005* (2013.01); *G05D 1/648* (2024.01)

(58) Field of Classification Search
CPC ... A01B 69/003; A01B 69/004; A01B 69/006; A01B 69/007; A01B 69/008; A01D 41/1278; A01D 78/1042; A01D 34/008; E02F 9/2087; E02F 9/225; G05D 1/0219; G05D 1/43; G05D 1/648; G05D 2105/05;
(Continued)

(56) References Cited

U.S. PATENT DOCUMENTS

2018/0210449 A1* 7/2018 Sakaguchi ........... A01B 69/008
2021/0247759 A1* 8/2021 Yoshimoto ............ G05D 1/226
2022/0232750 A1* 7/2022 Shirafuji .............. G05D 1/0278

FOREIGN PATENT DOCUMENTS

JP 2020129408 A 8/2020

* cited by examiner

*Primary Examiner* — Khoi H Tran
(74) *Attorney, Agent, or Firm* — Chris Mizumoto

(57) ABSTRACT

A position acquisition processing unit acquires positional information of a work vehicle. A halt acquisition processing unit acquires a halt instruction for a work of the work vehicle. A halt processing unit halts the work and travel of the work vehicle when the halt acquisition processing unit acquires the halt instruction. A calculation processing unit calculates a resumption position in which the work is to be resumed, on the basis of a halt instruction position indicating a position in which the halt instruction has been acquired, and a vehicle stop position indicating a position in which the work vehicle has stopped. A resumption processing unit moves the work vehicle to the resumption position calculated by the calculation processing unit and resumes the work.

11 Claims, 9 Drawing Sheets

(58) Field of Classification Search
CPC ........... G05D 2105/15; G05D 2107/21; G05D 2107/23
USPC .......................................................... 701/25
See application file for complete search history.

FIG. 1
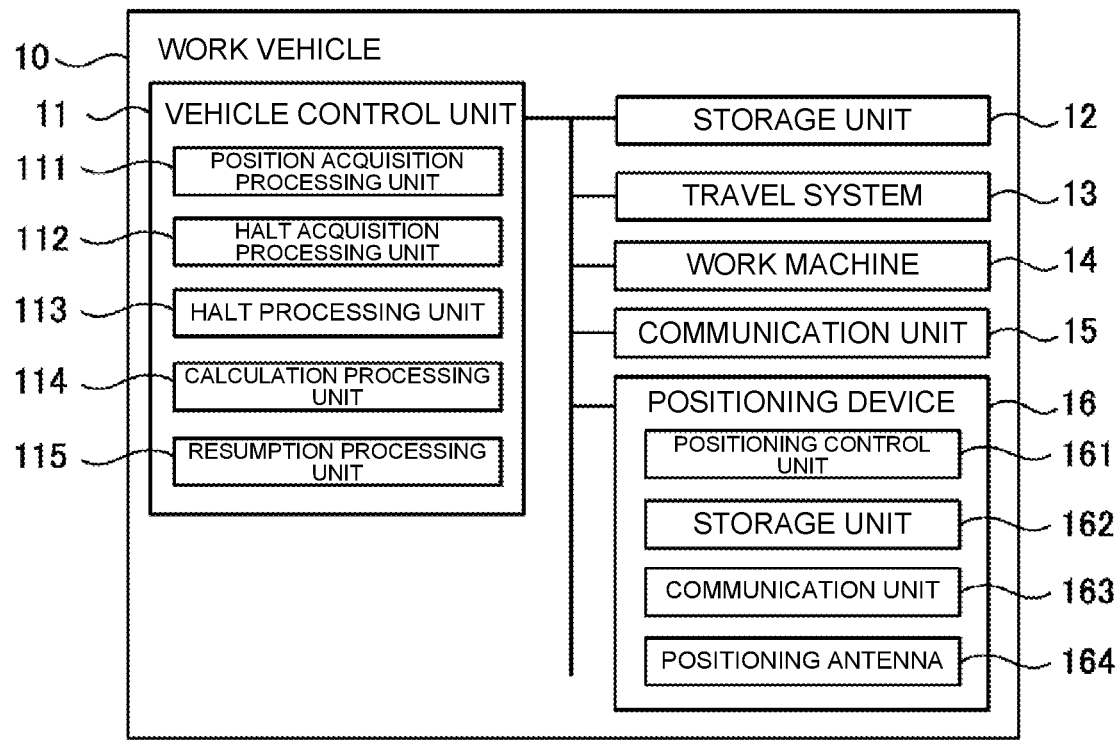
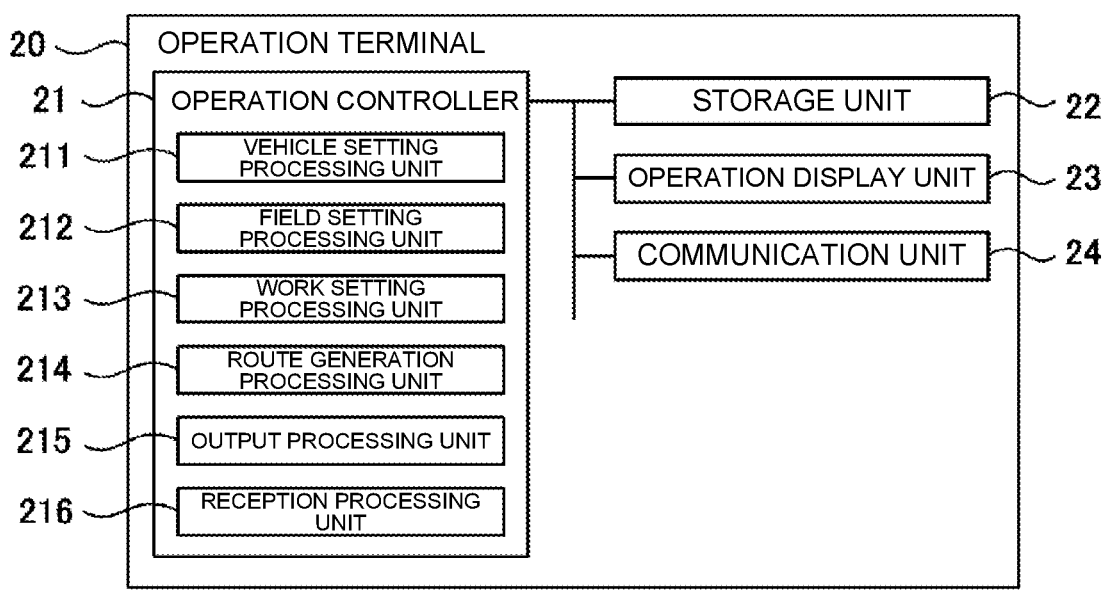

FIG. 4

| TIME INFORMATION | POSITION INFORMATION | HALT INSTRUCTION POSITION INFORMATION | VEHICLE STOP POSITION INFORMATION |
|---|---|---|---|
| t1 | X1, Y1 | | |
| t2 | X2, Y2 | | |
| t3 | X3, Y3 | | |
| t4 | X4, Y4 | | |
| t5 | X5, Y5 | | |
| t6 | X6, Y6 | | |
| ⋮ | ⋮ | ⋮ | ⋮ |
| t7 | X7, Y7 | | |
| t8 | X8, Y8 | X8, Y8 | |
| t9 | X9, Y9 | | |
| t10 | X10, Y10 | | |
| t11 | X11, Y11 | | |
| t12 | X12, Y12 | | |
| t13 | X13, Y13 | | X13, Y13 |
| t14 | X14, Y14 | | |
| t15 | X15, Y15 | | |
| ⋮ | ⋮ | ⋮ | ⋮ |

D1

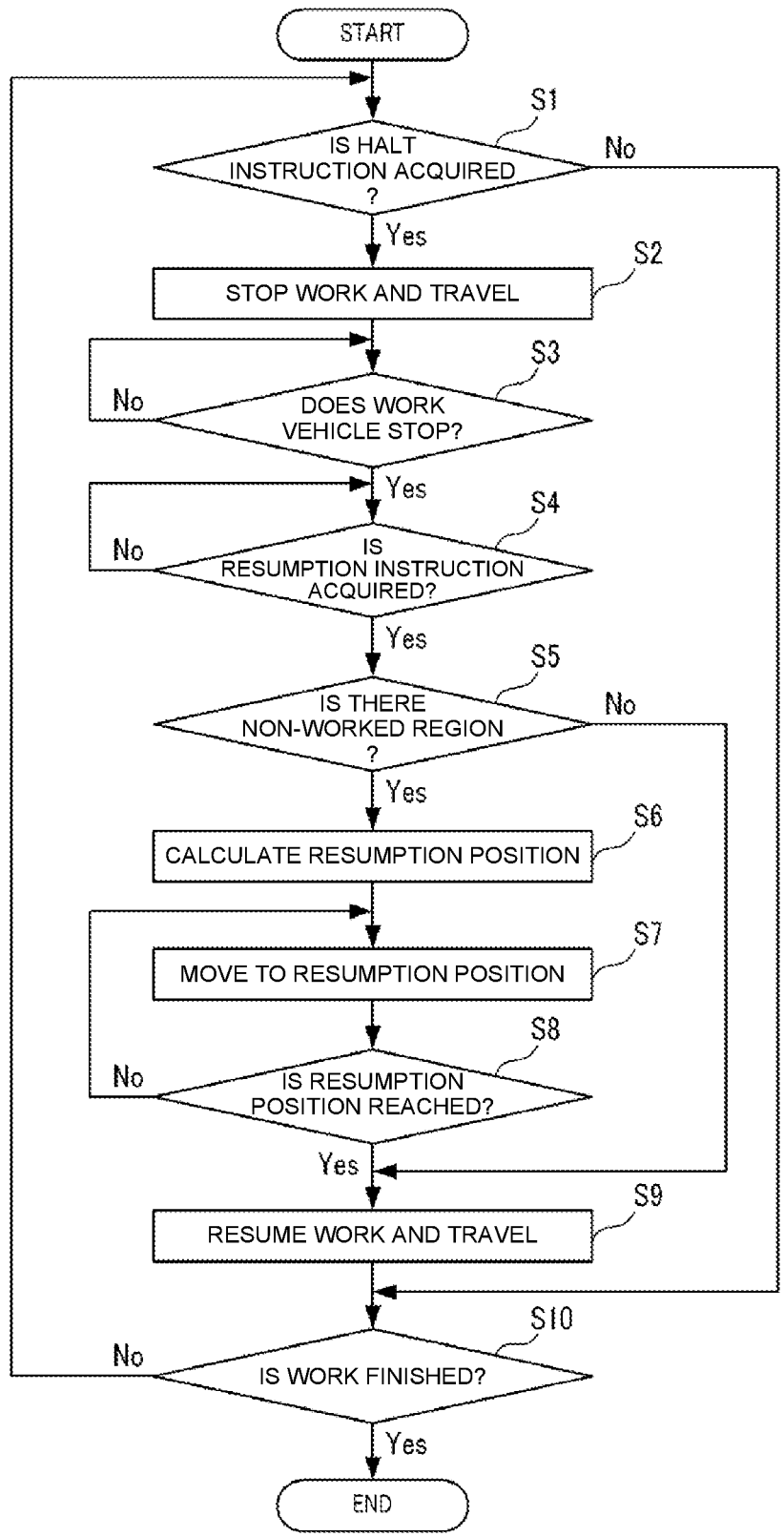

AUTONOMOUS TRAVEL SYSTEM, AUTONOMOUS TRAVEL METHOD, AND AUTONOMOUS TRAVEL PROGRAM

CROSS-REFERENCE

This application is a US National Stage Application under 35 U.S.C. § 371 of International Application No. PCT/JP2021/038858 filed Oct. 21, 2021, which claims foreign priority of JP2020-188654 filed Nov. 12, 2020 and the disclosures of which are hereby incorporated by reference in their entirety.

TECHNICAL FIELD

The present invention relates to an autonomous travel system, an autonomous travel method, and an autonomous travel program for causing a work vehicle to travel autonomously.

BACKGROUND ART

A work vehicle may suspend its work in the middle of autonomous traveling along a predetermined travel route in a field. Conventional art, which causes the work vehicle to resume the work from the suspended position when the work vehicle has suspended the work, is known (see, Patent Literature 1, for example).

CITATION LIST

Patent Literature

Patent Literature 1: Japanese Patent Laid-open Publication No. 2018-116613

DISCLOSURE OF INVENTION

Problems to be Solved by the Invention

Meanwhile, when stopping a work vehicle to suspend the work, an operator issues a halt instruction to the work vehicle using an operation terminal, for example. When the work vehicle acquires the aforementioned halt instruction, it stops the work and travel. In this case, the work vehicle travels a predetermined distance since the work is halted until the work vehicle is stopped because it takes some time since the work vehicle acquires the halt instruction until the work vehicle is stopped. In this case, when the work vehicle resumes the work from the vehicle stop position, the region corresponding to the predetermined distance becomes a non-worked region.

It is an object of the present invention to provide an autonomous travel system, an autonomous travel method, and an autonomous travel program capable of preventing a non-worked region from occurring when the work vehicle resumes the work after temporarily stopping the work and travel.

Means for Solving the Problems

An autonomous travel system of the present invention includes a position acquisition processing unit, a halt acquisition processing unit, a halt processing unit, and a resumption processing unit. The position acquisition processing unit acquires position information of the working vehicle. The halt acquisition processing unit acquires a halt instruction for work by the work vehicle. The halt processing unit stops working and traveling by the work vehicle when the halt acquisition processing unit acquires the halt instruction. The resumption processing unit moves the work vehicle to a resumption position where the work vehicle resumes the work that is specified based on a halt instruction position indicating a position where the halt instruction is acquired and a vehicle stop position indicating a position where the work vehicle is stopped, and causes the work vehicle to resume the work.

An autonomous travel method of the present invention, which is performed by one or more processors, includes: acquiring position information of a work vehicle; acquiring a halt instruction for work by the work vehicle; stopping working and traveling by the work vehicle when the halt instruction is acquired; and moving the work vehicle to a resumption position where the work vehicle resumes the work that is specified based on a halt instruction position indicating a position where the halt instruction is acquired and a vehicle stop position indicating a position where the work vehicle is stopped, and causing the work vehicle to resume the work.

An autonomous travel program of the present invention, which is for causing one or more processors to execute a procedure, includes: acquiring position information of a work vehicle; acquiring a halt instruction for work by the work vehicle; stopping working and traveling by the work vehicle when the halt instruction is acquired; and moving the work vehicle to a resumption position where the work vehicle resumes the work that is specified based on a halt instruction position indicating a position where the halt instruction is acquired and a vehicle stop position indicating a position where the work vehicle is stopped, and causing the work vehicle to resume the work.

Effect of the Invention

According to the present invention, it is possible to provide an autonomous travel system, an autonomous travel method, and an autonomous travel program capable of preventing a non-worked region from occurring when the work vehicle resumes the work after temporarily stopping the work and travel.

BRIEF DESCRIPTION OF DRAWINGS

FIG. 1 is a block diagram illustrating a configuration of an autonomous travel system according to an embodiment of the present invention.

FIG. 4 is a diagram illustrating position information of the work vehicle according to the embodiment of the present invention.

FIG. 8 is a flowchart showing an example of a procedure of an autonomous travel process executed by the autonomous travel system according to the embodiment of the present invention.

DESCRIPTION OF EMBODIMENTS

The following embodiments are examples that embodies the present invention, and are not intended to limit the technical scope of the present invention.

As shown in FIG. 1, an autonomous travel system 1 according to an embodiment of the present invention includes a work vehicle 10 and an operation terminal 20. The work vehicle 10 and the operation terminal 20 can communicate with each other via a communication network N1. For example, the work vehicle 10 and the operation terminal 20 can communicate with each other via a portable telephone line network, a packet line network, or a wireless LAN.

In the present embodiment, an example, in which the work vehicle 10 is a tractor, is described. As another embodiment, the work vehicle 10 may be a rice transplanter, a combine, a construction machine, a snowplow, or the like. The work vehicle 10 is a so-called robot tractor including a configuration that can autonomously travel (automatically travel) in a field F (see FIG. 3) along a predetermined travel route Ra. For example, the work vehicle 10 can travel autonomously along the travel route Ra that is generated for the field F in advance based on position information on a current position P1 of the work vehicle 10, which is calculated by a positioning device 16.

Figure 3:
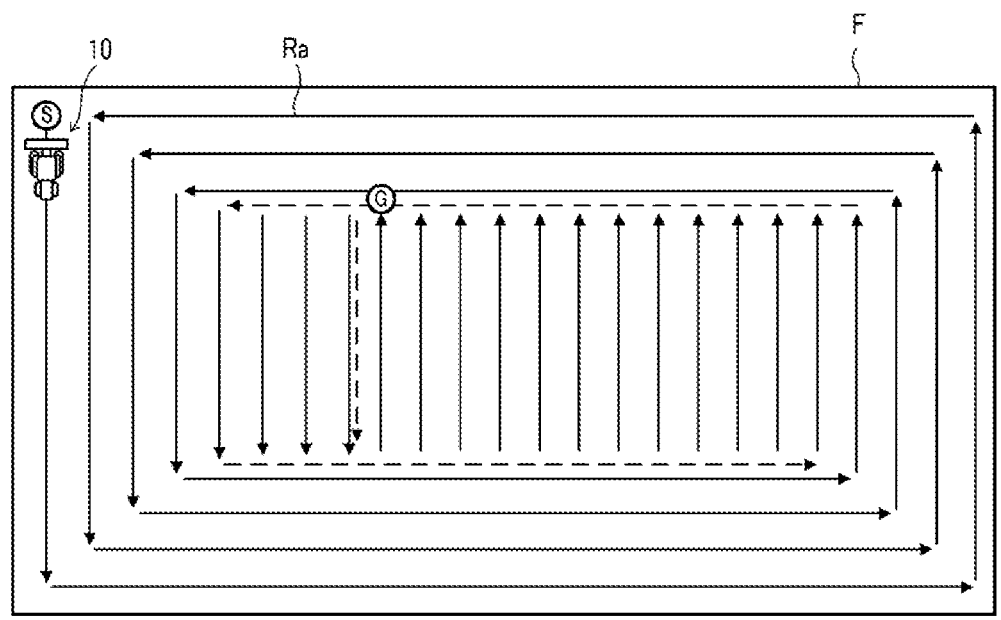
FIG. 3 is a diagram illustrating an example of a travel route of the work vehicle according to the embodiment of the present invention.

For example, the work vehicle 10 travels in a spiral manner from a work start position S of the outside of the work region in the field F to a work end position G of the inside of the work region in the field F shown in FIG. 3, and travels in a parallel-zigzag manner at the inside of the work region. The travel route shown by a dotted line of the inside of the field F indicates a route where the work vehicle travels with a work machine 14 being raised (idling travel route). The travel route Ra is not limited to the route shown in FIG. 3.

Work Vehicle 10

Figure 2:
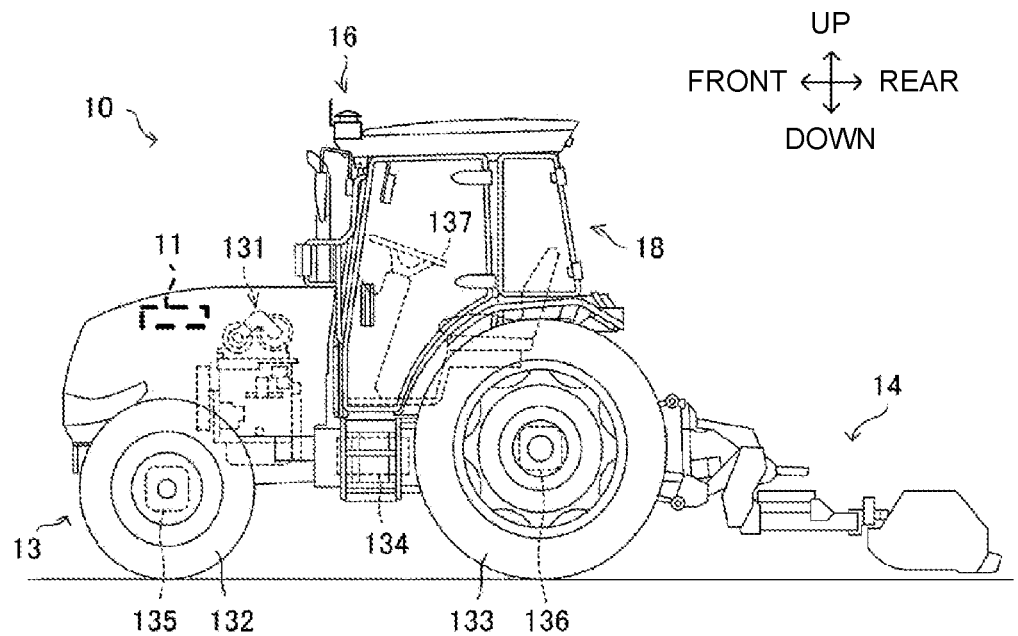
FIG. 2 is an appearance view illustrating an example of a work vehicle according to the embodiment of the present invention.

As shown in FIGS. 1 and 2, the work vehicle 10 includes a vehicle control unit 11, a storage unit 12, a travel system 13, the work machine 14, a communication unit 15, a positioning device 16, and the like. The vehicle control unit 11 is electrically connected to the travel system 13, the work machine 14, the positioning device 16, and the like. Here, the vehicle control unit 11 and the positioning device 16 can wirelessly communicate with other device.

The storage unit 12 is a non-volatile storage unit, such as a hard disk drive (HDD) or a solid state drive (SSD) that stores the various types of information. The storage unit 12 stores a control program such as an autonomous travel program for causing the vehicle control unit 11 to execute an autonomous travel process described later (see FIG. 8). For example, the autonomous travel program is non-transitorily recorded in a computer-readable recording medium such as a CD or a DVD, is read out by a given reading unit (not shown), and is stored in the storage unit 12. It should be noted that the autonomous traveling program may be downloaded from a server (not shown) to the work vehicle 10 via the communication network N1 and be stored in the storage unit 12. The storage unit 12 also stores data of the travel route Ra generated at the operation terminal 20 and data of position information D1 (see FIG. 4) of the work vehicle 10, which is measured by the positioning device 16. The storage unit 12 may also store work information (e.g., amount of reaping, amount of harvest, etc.).

The travel system 13 is a drive unit for driving the work vehicle 10. As shown in FIG. 2, the travel system 13 includes an engine 131, a front wheel 132, a rear wheel 133, a transmission 134, a front axle 135, a rear axle 136, a steering wheel 137, and the like. The front wheel 132 and the rear wheel 133 are each provided on each side of the work vehicle 10. The travel system 13 is not limited to be of a wheel type including the front wheels 132 and the rear wheels 133 but may be of a crawler type including a crawler that is provided to each side of the work vehicle 10.

The engine 131 is a drive source, such as a diesel engine or a gasoline engine, that is driven by using fuel supplied to a fuel tank (not shown). The travel system 13 may include an electric motor as the drive source together with the engine 131 or in place of the engine 131. A generator (not shown) is connected to the engine 131, and electric power is supplied from the generator to electrical components such as the vehicle control unit 11, a battery, and the like that are provided in the work vehicle 10. The battery is charged by electric power that is supplied from the generator. The electrical components such as the vehicle control unit 11 and the positioning device 16, which are provided in the work vehicle 10, can be driven by the electric power supplied from the battery even after the engine 131 is stopped.

Drive power of the engine 131 is transmitted to the front wheels 132 via the transmission 134 and the front axle 135 and is transmitted to the rear wheels 133 via the transmission 134 and the rear axle 136. In addition, drive power of the engine 131 is transmitted via a PTO shaft (not shown) to the work machine 14. In the case where the work vehicle 10 travels autonomously, the travel system 13 performs travel operation according to an instruction from the vehicle control unit 11.

Examples of the work machine 14 are a mower, a cultivator, a plow, a fertilizer, a sowing machine, etc., and the work machine 14 is detachable to/from the work vehicle 10. This allows the work vehicle 10 to perform various types of works by using the respective work machine 14. In the present embodiment, an example, in which the work machine 14 is the mower, is described.

In the work vehicle 10, the work machine 14 may be liftably supported by a lift mechanism (not shown). The vehicle control unit 11 can lift/lower the work machine 14 by controlling the lift mechanism. For example, the vehicle control unit 11 lowers the work machine 14 when the work vehicle 10 travels forward in a work target region of the field F, and lifts the work machine 14 when the work vehicle 10 travels rearward therein. Furthermore, when acquiring a work halt instruction, the vehicle control unit 11 outputs a work stop command to the work machine 14. For example, in the case where an operator performs to issue a halt instruction on the operation terminal 20, the vehicle control unit 11 acquires the halt instruction from the operation terminal 20. Upon acquiring the work halt instruction, the vehicle control unit 11 stops driving the PTO shaft to stop the work of the work machine 14. The details of the vehicle control unit 11 will be described below.

The steering wheel 137 is a manipulation unit that is operated by the user (operator) or the vehicle control unit 11. For example, in the travel system 13, an angle of the front wheel 132 is changed by a hydraulic power steering mechanism (not shown) in response to operation of the steering wheel 137 by the vehicle control unit 11, so that a traveling direction of the work vehicle 10 is changed.

In addition to the steering wheel 137, the travel system 13 includes a shift lever, an accelerator, a brake, and the like (all not shown), which are operated by the vehicle control unit 11. In the travel system 13, a gear of the transmission 134 is switched to a forward gear, a reverse gear, or the like in response to operation of the shift lever by the vehicle control unit 11, so that a travel mode of the work vehicle 10 is switched to a forward travel, a reverse travel, or the like, respectively. In addition, the vehicle control unit 11 operates the accelerator to control a speed of the engine 131. Furthermore, the vehicle control unit 11 operates the brake and brakes rotation of the front wheels 132 and the rear wheels 133 by using an electromagnetic brake.

The positioning device 16 is a communication device that includes a positioning control unit 161, a storage unit 162, a communication unit 163, a positioning antenna 164, and the like. For example, as shown in FIG. 2, the positioning device 16 is provided on top of a cabin 18 in which the operator gets. An installation position of the positioning device 16 is not limited to the cabin 18. Furthermore, the positioning control unit 161, the storage unit 162, the communication unit 163, and the positioning antenna 164 of the positioning device 16 may be separately located at different positions in the work vehicle 10. As described above, the battery is connected to the positioning device 16, and the positioning device 16 can be operated even when the engine 131 is stopped. For example, a mobile phone terminal, a smartphone, a tablet terminal, or the like may be used in place of the positioning device 16.

The positioning control unit 161 is a computer system that includes one or more processors and storage memory such as non-volatile memory and RAM. The storage unit 162 is a non-volatile memory or the like that stores a program for causing the positioning control unit 161 to execute positioning process and data such as positioning information and movement information. For example, the abovementioned program is non-transiently recorded in a computer-readable recording medium such as a CD or a DVD, is read out by a predetermined reader (not shown), and is stored in the storage unit 162. The program may be downloaded to the positioning device 16 from a server (not shown) via the communication network N1 and stored in the storage unit 162.

The communication unit 163 is a communication interface that connects the positioning device 16 to the communication network N1 in a wired or wireless manner to perform data communication with an external device such as a base station server via the communication network N1 according to a predetermined communication protocol.

The positioning antenna 164 is an antenna to receive a radio wave (a GNSS signal) transmitted from a satellite.

The positioning control unit 161 calculates the position (the current position P1) of the work vehicle 10 based on the GNSS signal that is received by the positioning antenna 164 from the satellite. For example, in the case where the positioning antenna 164 receives the radio waves (emitted time, locus information, and the like) transmitted from the plural satellites when the work vehicle 10 performs the autonomous travel in the field F, The positioning control unit 161 calculates distances between the positioning antenna 164 and each of the satellites and calculates the current position P1 (a latitude and a longitude) of the work vehicle 10 based on the calculated distances. The positioning control unit 161 may perform the positioning by adopting a real-time kinematic positioning method (an RTK-GPS positioning method, hereinafter referred to as an "RTK method") to calculate the current position P1 of the work vehicle 10 by using correction information that corresponds to the base station (a reference station) near the work vehicle 10. In such a way, the work vehicle 10 performs the autonomous travel by using the positioning information acquired by the RTK method.

The vehicle control unit 11 has control devices such as a CPU, ROM, and RAM. The CPU is a processor that performs various types of arithmetic processes. The ROM is the non-volatile storage unit that stores, in advance, the control programs such as a BIOS and an OS for causing the CPU to execute the various types of the arithmetic process. The RAM is a volatile or non-volatile storage unit that stores the various types of information and is used as a transient storage memory (a works region) for various types of processes executed by the CPU. By executing the various types of control programs which are stored in the ROM or the storage unit 12 in advance, the vehicle control unit 11 controls the work vehicle 10. The vehicle control unit 11 controls operation of the work vehicle 10 in response to the various types of user's operations on the work vehicle 10. In addition, the vehicle control unit 11 performs an autonomous travel process of the work vehicle 10 based on the current position P1 of the work vehicle 10, which is calculated by the positioning device 16, and the travel route Ra which is generated in advance.

As shown in FIG. 1, the vehicle control unit 11 includes various types of processing units such as a position acquisition processing unit 111, a halt acquisition processing unit 112, halt processing unit 113, a calculation processing unit 114, and a resumption processing unit 115. The vehicle control unit 11 functions as the various types of processing units by executing by the CPU various types of processes in accordance with the autonomous travel program. Some or all of the processing units may be composed of an electronic circuit. The autonomous travel program may be a program for causing multiple processors to function as the processing units.

The position acquisition processing unit 111 acquires position information of the work vehicle 10. Specifically, the position acquisition processing unit 111 acquires the current position P1 of the work vehicle 10 based on positioning information measured by the positioning device 16. Upon acquiring the current position P1, the position acquisition processing unit 111 registers it in the position information D1 of the storage unit 12. As shown in FIG. 4, the position information D1 includes data such as time information, position information, halt instruction position information, and vehicle stop position information. The time information is information about a time when the positioning device 16 takes a measurement at predetermined sampling time intervals. The position information is information about a position indicating the current position P1 of the work vehicle 10 corresponding to the time information. The position acquisition processing unit 111 is an example of a position acquisition processing unit of the present invention.

The halt acquisition processing unit 112 acquires a halt instruction for the work by the work vehicle 10 (e.g., mowing work by the work machine 14). Specifically, in the case where an operator performs operation of the halt instruction on the operation terminal 20, the halt acquisition processing unit 112 acquires the halt instruction from the operation terminal 20. The halt acquisition processing unit 112 also acquires the aforementioned halt instruction from an obstacle detection sensor (not shown) mounted on the work vehicle 10 in the event where the obstacle detection sensor detects an obstacle. The halt acquisition processing unit 112 also acquires the aforementioned halt instruction in the event where the work vehicle 10 deviates from the travel route Ra. The halt acquisition processing unit 112 also acquires the aforementioned halt instruction in the event where communication of the work vehicle 10 is interrupted. The halt acquisition processing unit 112 is an example of a halt acquisition processing unit of the present invention.

The halt processing unit 113 performs the halt process to stop working and traveling by the work vehicle 10 when the halt acquisition processing unit 112 acquires the halt instruction. Specifically, the halt processing unit 113 stops the PTO shaft drive to stop the work of the work machine 14 when the halt acquisition processing unit 112 acquires the halt instruction. The halt processing unit 113 also operates the brake to stop the work vehicle 10 by braking the rotation of the front wheels 132 and rear wheels 133 wheels by using the electromagnetic brake. The halt processing unit 113 is an example of a halt processing unit of the present invention.

Figure 5A:
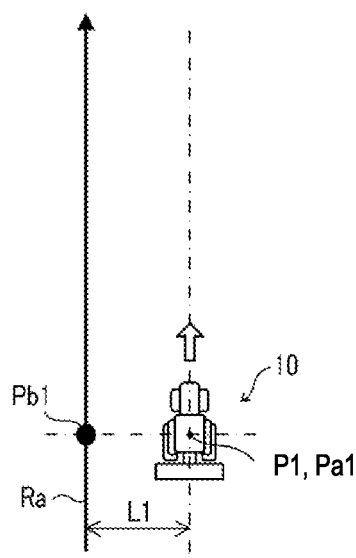
FIG. 5A is a diagram illustrating a halt instruction position of the work vehicle according to the embodiment of the present invention.
Figure 5B:
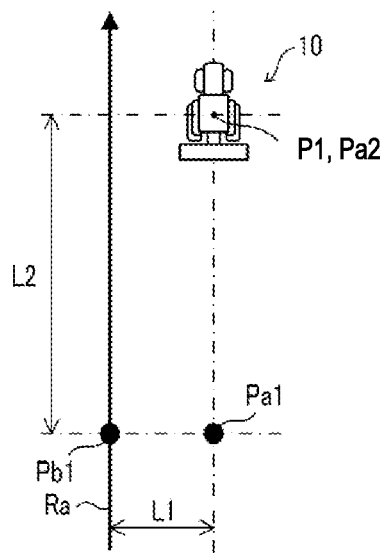
FIG. 5B is a diagram illustrating a vehicle stop position of the work vehicle according to the embodiment of the present invention.

Here, when acquiring the halt instruction, the work vehicle 10 performs the halt process that stops working and traveling. However, because it takes some time since the halt instruction is acquired until the work vehicle is stopped, the work vehicle travels a predetermined distance since the work is halted until the work vehicle is stopped. For example, as shown in FIG. 5A, if the work vehicle 10 acquires the halt instruction at position Pa1 and performs the halt process, the work machine 14 stops working at the position Pa1. In contrast, as shown in FIG. 5B, the work vehicle 10 travels (coasts) for a predetermined distance L2 (several meters) and stops at position Pa2. In this case, for example, if the work vehicle 10 resumes working and traveling from the position Pa2, there is a problem that a region corresponding to the predetermined distance L2 becomes a non-worked region.

As shown in FIGS. 5A and 5B, actually the work vehicle 10 may travel laterally deviating from a target travel route Ra by a predetermined distance L1 (several cm) due to the condition of the field F and the like.

The vehicle control unit 11 performs the following process in order to prevent the non-worked region from occurring.

The position acquisition processing unit 111 acquires the halt instruction position Pa1 which indicates a position of the work vehicle 10 at a time when the halt instruction is acquired, and registers it in the position information D1 (see FIG. 4). The position acquisition processing unit 111 also acquires the vehicle stop position Pa2 which indicates a position where the work vehicle 10 is stopped, and registers it in the position information D1 (see FIG. 4). In the example shown in FIG. 4, "X8, Y8" indicates the halt instruction position Pa1, and "X13, Y13" indicates the vehicle stop position Pa2. A distance from "X8, Y8" to "X13, Y13" corresponds to the predetermined distance L2 (see FIG. 5B).

The calculation processing unit 114 calculates a resumption position where the work vehicle 10 resumes working based on the halt instruction position Pa1 and the vehicle stop position Pa2. The resumption processing unit 115 moves the work vehicle to the resumption position where the work vehicle 10 resumes working, which is identified based on the halt instruction position Pa1 and the vehicle stop position Pa2, to cause the work vehicle to resume working. Specifically, the resumption processing unit 115 moves the work vehicle 10 to the resumption position calculated by the calculation processing unit 114 to cause the work vehicle to resume working. The resumption processing unit 115 may perform the resumption process to resume working when it acquires an instruction to resume the work of the work vehicle 10 (resumption instruction). For example, when the operator performs operation of a resumption instruction on the operation terminal 20, the resumption processing unit 115 acquires the resumption instruction from the operation terminal 20 and executes the resumption process. The calculation processing unit 114 is an example of a calculation processing unit of the present invention. The resumption processing unit 115 is an example of a resumption processing unit of the present invention.

Figure 5C:
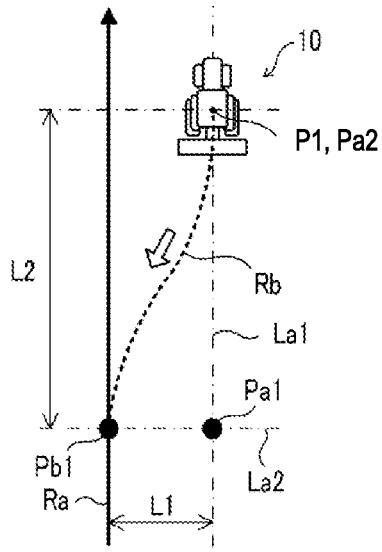
FIG. 5C is a diagram illustrating a retreat route of the work vehicle according to the embodiment of the present invention.

Specifically, as shown in FIG. 5C, the calculation processing unit 114 calculates an intersection point Pb1 as the resumption position, which is the intersection point of an orthogonal line La2 that is orthogonal to a straight line La1 passing through the halt instruction position Pa1 and the vehicle stop position Pa2 as well as passes through the halt instruction position Pa1, and a straight line indicating the travel route Ra. The calculation processing unit 114 may calculate a position on the travel route Ra closest to the halt instruction position Pa1 as the resumption position.

Figure 5D:
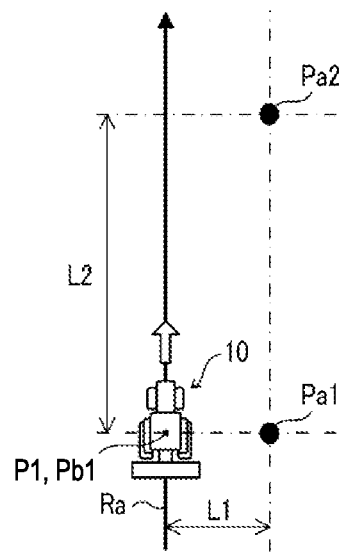
FIG. 5D is a diagram illustrating a resumption position of the work vehicle according to the embodiment of the present invention.

The resumption processing unit 115 retreats the work vehicle 10 along the route Rb (retreat route) from the vehicle stop position Pa2 to the resumption position Pb1, as shown in FIG. 5C. The route Rb may include a straight route (forward and backward) and a turning route. When the work vehicle 10 arrives at the resumption position Pb1, the resumption processing unit 115 causes the work vehicle 10 to travel forward along the travel route Ra and causes the work machine 14 to resume working, as shown in FIG. 5D. In this way, the resumption processing unit 115 uses the travel route Ra when retreating the work vehicle 10 from the vehicle stop position Pa2 to the resumption position Pb1. In other words, the resumption position Pb1 is set on the travel route Ra. In addition, the resumption processing unit 115 drives the work vehicle 10 along the shortest route, for example from the vehicle stop position Pa2 to the resumption position Pb1, using a well-known technique. Therefore, when moving the work vehicle 10 from the vehicle stop position Pa2 to the resumption position Pb1, it is not necessary to generate a new route from the vehicle stop position Pa2 to the resumption position Pb1. Thus, processing load of the vehicle control unit 11 can be reduced.

Here, an overlap width of about 10 cm is set between a working width on a current work route of the work vehicle 10 and the working width on a next work route. Therefore, even if the work vehicle 10 is retreated on the travel route Ra by setting the aforementioned resumption position on the travel route Ra, no non-worked region occurs. Furthermore, the lateral deviation can be eliminated by moving the work vehicle back onto the travel route Ra.

In the case where the deviation from the travel route Ra (predetermined distance L1) does not occur or can be ignored, the calculation processing unit 114 may calculate the halt instruction position Pa1 as the resumption position. In this case, the resumption processing unit 115 moves (retreats) the work vehicle 10 to the halt instruction position Pa1 (resumption position) and then resumes working from the halt instruction position Pa1.

Figure 6A:
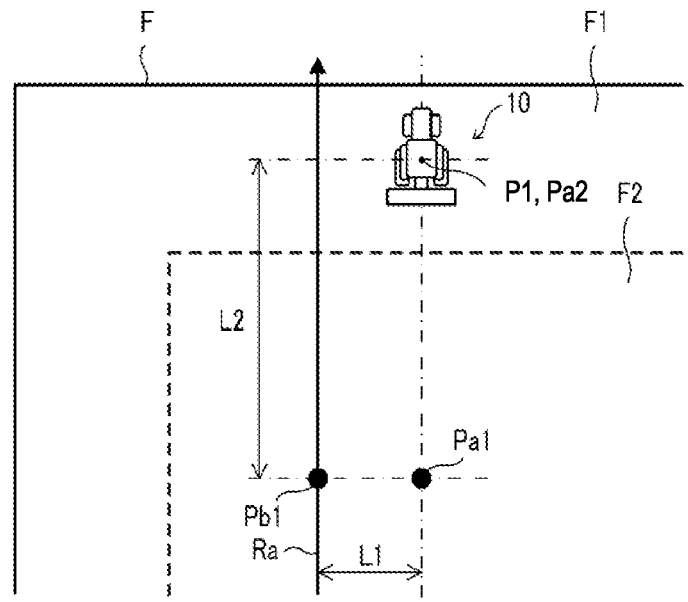
FIG. 6A is a diagram illustrating a vehicle stop position of the work vehicle according to the embodiment of the present invention.
Figure 6B:
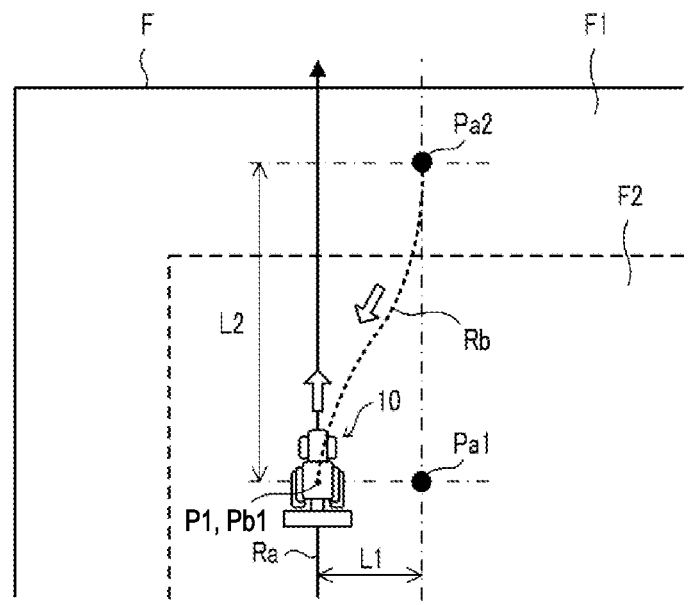
FIG. 6B is a diagram illustrating a resumption position of the work vehicle according to the embodiment of the present invention.

Meanwhile, in the case where the field F includes a non-worked region where work is not required and the work vehicle 10 coasts across the non-worked region, it is preferable that the calculation processing unit 114 sets the aforementioned resumption position in the work region. For example, the field F shown in FIG. 6A includes a work region F2 and a non-worked region F1 (e.g., headland area) around the work region F2. In this case, as shown in FIG. 6A, if the position acquisition processing unit 111 acquires the halt instruction position Pa1 in the work region F2 and the vehicle stop position Pa2 in the non-worked region F1, the calculation processing unit 114 calculates the position Pb1 on the travel route Ra in the work region F2 as the resumption position. The resumption processing unit 115 retreats the work vehicle 10 along the route Rb from the vehicle stop position Pa2 to the resumption position Pb1, as shown in FIG. 6B. When the work vehicle 10 reaches the resumption position Pb1, the resumption processing unit 115 causes the work vehicle 10 to travel forward along the travel route Ra and causes the work machine 14 to resume working.

Figure 7A:
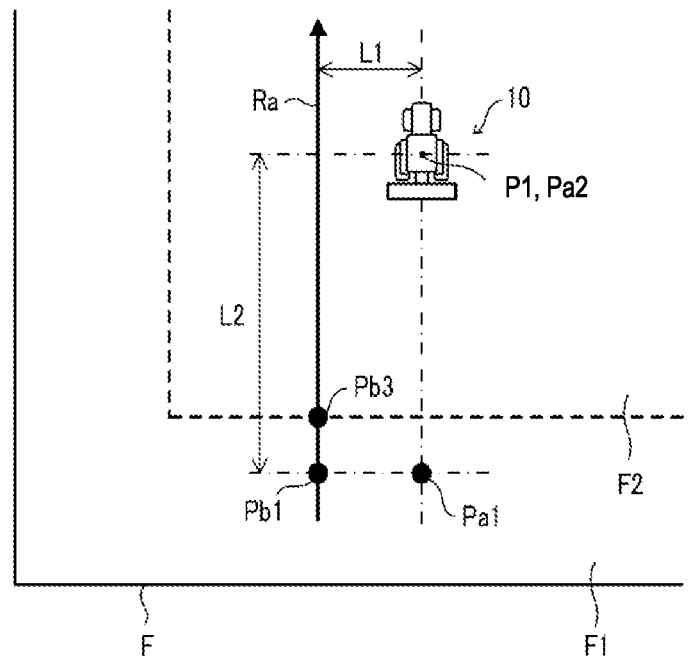
FIG. 7A is a diagram illustrating a vehicle stop position of the work vehicle according to the embodiment of the present invention.
Figure 7B:
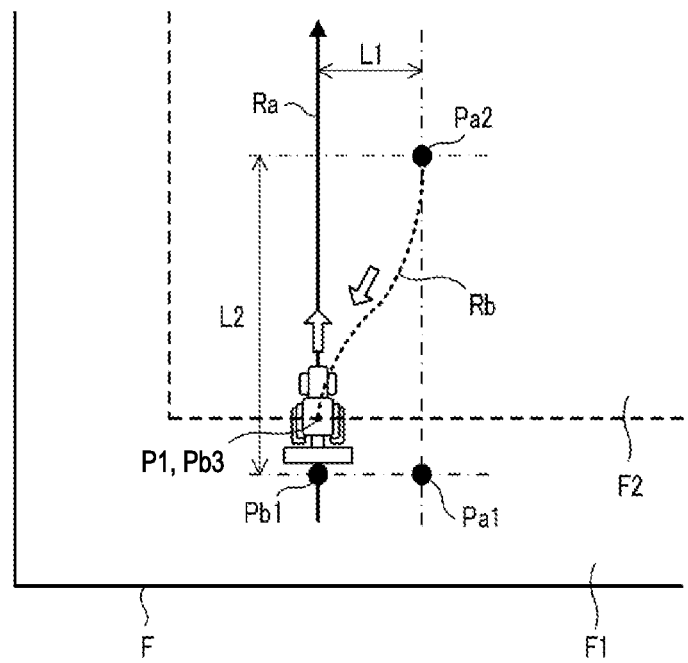
FIG. 7B is a diagram illustrating a resumption position of the work vehicle according to the embodiment of the present invention.

In contrast, as shown in FIG. 7A, if the position acquisition processing unit 111 acquires the halt instruction position Pa1 in the non-worked region F1 and the vehicle stop position Pa2 in the work region F2, the calculation processing unit 114 calculates an end Pb3 on the travel route Ra in the work region F2 as the resumption position. In other words, the calculation processing unit 114 does not set the position Pb1 (or halt instruction position Pa1) on the travel route Ra in the non-worked region F1 as the resumption position. The resumption processing unit 115 then retreats the work vehicle along the route Rb from the vehicle stop position Pa2 to a resumption position Pb3, as shown in FIG. 7B. When the work vehicle 10 reaches the resumption position Pb3, the resumption processing unit 115 causes the work vehicle 10 to travel forward along the travel route Ra and causes the work machine 14 to resume working. According to this configuration, it is not necessary to return the work vehicle 10 to the non-worked region F1, thereby preventing work efficiency from decreasing.

If both the halt instruction position Pa1 and the vehicle stop position Pa2 are located in the non-worked region F1, the work vehicle 10 does not work. So when resuming traveling, the resumption processing unit 115 causes the work vehicle 10 to resume traveling from the vehicle stop position Pa2.

In this way, if at least one of the halt instruction position Pa1 and the vehicle stop position Pa2 is located in the work region F2, the resumption processing unit 115 moves the work vehicle 10 to the resumption position (retreat movement) and causes the work vehicle 10 to resume working. The calculation processing unit 114 also sets the resumption position within the work region F2.

The travel route Ra on which the work vehicle 10 travels is generated by the operation terminal 20, for example. The work vehicle 10 acquires the travel route Ra from the operation terminal 20 and performs the work by the work machine 14 while traveling autonomously along the travel route Ra in the field F.

Operation Terminal 20 As shown in FIG. 1, the operation terminal 20 is an information processing device that has an operation controller 21, a storage unit 22, an operation display unit 23, a communication unit 24, and the like. The operation terminal 20 may be a mobile terminal such as a tablet terminal or a smartphone.

The communication unit 24 is a communication interface that connects the operation terminal 20 to the communication network N1 in a wired or wireless manner to perform data communication with an external device such as one or more work vehicles 10, via the communication network N1 according to a predetermined communication protocol.

The operation display unit 23 is a user interface that includes a display unit, such as a liquid crystal display or an organic EL display, that displays various types of information, and the manipulation unit, such as a touch panel, a mouse, or a keyboard, that accepts operation. On an operation screen that is displayed in the display unit, the operator can operate the manipulation unit to perform operations for registering various types of information (work vehicle information, field information, work information, and the like described below). In addition, the operator can operate the manipulation unit to issue an autonomous travel instruction to the work vehicle 10. Furthermore, at a position away from the work vehicle 10, the operator can comprehend a travel state of the work vehicle 10, which travels autonomously along the travel route Ra in the field F, from the travel trajectory that is displayed on the operation terminal 20.

The storage unit 22 is a non-volatile storage unit, such as a hard disk drive (HDD) or a solid state drive (SSD), that stores the various types of information. The storage unit 22 stores a control program for causing the operation controller 21 to perform a predetermined control process. For example, the control program is non-transiently recorded in a computer-readable recording medium such as a CD or a DVD, is read out by a predetermined reader (not shown) provided with the operation terminal 20, and is stored in the storage unit 22. Note that the abovementioned control program may be downloaded from a server (not illustrated) to the operation terminal 20 via the communication network N1 and be stored in the storage unit 22. The storage unit 22 may also store the work information (a mowing amount, a harvest amount, or the like) that is sent from the work vehicle 10.

In addition, a dedicated application for the autonomous travel of the work vehicle 10 is installed in the storage unit 22. The operation controller 21 activates the dedicated application, executes a setting process of the various types of information on the work vehicle 10 and a travel route generation process of the work vehicle 10, and issues the autonomous travel instruction to the work vehicle 10.

The operation controller 21 has control devices such as a CPU, a ROM, and a RAM. The CPU is a processor that performs various types of arithmetic processes. The ROM is the non-volatile storage unit that stores, in advance, the control programs such as a BIOS and an OS for causing the CPU to execute the various types of the arithmetic process. The RAM is a volatile or non-volatile storage unit that stores the various types of information and is used as a transient storage memory (a works region) for various types of processes executed by the CPU. The operation controller 21 controls the operation terminal 20 by allowing the CPU to execute the various types of control programs stored in advance in the ROM or the storage unit 22.

As shown in FIG. 1, the operation controller 21 includes various types of processing units such as a vehicle setting processing unit 211, a field setting processing unit 212, a work setting processing unit 213, a route generation processing unit 214, an output processing unit 215, and a reception processing unit 216. Note that the operation controller 21 functions as the various types of processing units by allowing the CPU to execute the various types of processes in accordance with the control programs. Some or all of the processing units may be composed of an electronic circuit. Note that the control program may be a program for causing a plurality of processors to function as the processing units.

The vehicle setting processing unit 211 sets information about the work vehicle (hereinafter, referred to as "work vehicle information"). According to the registration operation on the operation terminal 20 by the operator, the vehicle setting processing unit 211 sets information on a model of the work vehicle 10, an attachment position of the positioning antenna 164 in the work vehicle 10, a type of the work machine 14, a size and a shape of the work machine 14, a position of the work machine 14 with respect to the work vehicle 10, a vehicle speed and the engine speed of the work vehicle during the work, the vehicle speed and the engine speed of the work vehicle 10 during turning, and the like.

The field setting processing unit 212 sets information about the field F (hereinafter, referred to as "field information"). According to the registration operation on the operation terminal 20 by the operator, the field setting processing unit 212 sets information on a position and shape of the field F, a work start position S where the work is started and a work end position G where the work is finished, a work direction, and the like.

The work direction means a direction in which the work vehicle 10 travels while performing the work by means of the work machine 14 in the work region that is the field F excluding non-worked regions such as a headland, non-cultivated land, or the like.

The information on the position and shape of the field F can be acquired automatically by driving the work vehicle 10 with the operator getting in one round of the field F along the outer periphery of the field F to record transition of the position information of the positioning antenna 164, for example. The position and shape of the field F can be also acquired based on a polygon that is obtained by the operator operating the operation terminal 20 with a map being displayed on the operation terminal 20 to designate a plurality of points on the map. The region specified by the acquired position and shape of the field F is a region (travel region) where the work vehicle 10 can travel.

The work setting processing unit 213 sets information on how to specifically perform the work (hereinafter, referred to as the "work information"). The work setting processing unit 213 is configured in such a way that presence or absence of a cooperative work by the work vehicle 10 (unmanned tractor) and a manned work vehicle 10, the number of skips, which is the number of work routes to be skipped in the case where the work vehicle 10 turns around in a headland, a width of the headland, a width of a non-cultivated field, and the like are settable as work information.

The route generation processing unit 214 generates a travel route Ra for the autonomous travel of the work vehicle 10 based on the abovementioned set information. The travel route Ra is a route from the work start position S to the work end position G, for example (see FIG. 3). The travel route Ra shown in FIG. 3 is a route along which the work vehicle 10 travels in a spiral manner from the outside to the inside of the work region in the field F and travels in parallel-zigzag manner at the inside of the work region. In the example shown in FIG. 3, since the work vehicle 10 mows the entire region in the field F, the entire route from the outer periphery of the field toward the inside of the field becomes the work route. The route generation processing unit 214 can generate and store the travel route Ra of the work vehicle 10 based on the set information each set at the vehicle setting processing unit 211, the field setting processing unit 212, and the work setting processing unit 213.

Specifically, the route generation processing unit 214 generates the travel route Ra (see FIG. 3) based on the work start position S and the work end position G registered in the field setting. In the travel route Ra shown in FIG. 3, the route shown by the dotted line included in the inside travel route Ra indicates the route where the work vehicle travels with the work machine 14 being raised (idling travel route). The travel route Ra is not limited to the route shown in FIG. 3.

The work vehicle 10 is configured such that the data on the travel route Ra generated on the operation terminal 20 is transferred to the work vehicle 10, and stored in the storage unit 12 as well as the work vehicle 10 can travel autonomously along the travel route Ra while detecting the current position P1 of the work vehicle 10 by the positioning antenna 164. Note that the current position P1 of the work vehicle 10 is usually coincident with a position of the positioning antenna 164.

The work vehicle 10 according to the present embodiment travels on a substantially rectangular-shaped field F as shown in FIG. 3. The work vehicle 10 is configured such that in the case where the current position P1 is located at the inside of the field F, the work vehicle can travel autonomously, and in the case where the current position P1 is located at the outside of the field F (public road, etc.), the work vehicle cannot travel autonomously. Furthermore, the work vehicle 10 is configured such that in the case where the current position P1 is coincident with the work start position S, the work vehicle can travel autonomously, for example.

In the case where the current position P1 is coincident with the work start position, if the operator presses down a work start button on the operation screen to issue the instruction of the "work start", the vehicle control unit 11 allows the work vehicle 10 to initiate the work by the work machine 14 (see FIG. 2). That is, the operation controller 21 allows for the autonomous travel of the work vehicle 10 on the condition that the current position P1 is coincident with the work start position S. Note that the condition of allowing for the autonomous travel of the work vehicle 10 is not limited to the abovementioned condition.

The output processing unit 215 outputs information on the travel route Ra, which is generated by the route generation processing unit 214, to the work vehicle 10. In addition, the output processing unit 215 can issue an instruction to the work vehicle to initiate or stop the autonomous travel by transmitting a control signal to the work vehicle 10 via the communication unit 24. This allows the work vehicle 10 to travel autonomously.

The vehicle control unit 11 causes the work vehicle 10 to travel autonomously from the work start position S to the work end position G based on the travel route Ra that is acquired from the operation terminal 20. When the work vehicle 10 finishes the work, the vehicle control unit 11 may cause the work vehicle 10 to travel autonomously from the work end position to an entrance of the field F. In the case where the work vehicle 10 travels autonomously, the operation controller 21 can receive a state of the work vehicle 10 (position, travel speed, and the like) from the work vehicle 10 and cause the operation display unit 23 to display it.

The reception processing unit 216 accepts operation (halt instruction operation) from the operator to stop the work of the work vehicle 10 traveling autonomously. For example, in the case where the operator performs the halt instruction operation on the operation display unit 23, the reception processing unit 216 accepts the halt instruction operation. In response to that the reception processing unit 216 accepts the halt instruction operation, the output processing unit 215 outputs the halt instruction to the work vehicle 10. This allows the vehicle control unit 11 (halt acquisition processing unit 112) of the work vehicle 10 to acquire the halt instruction from the operation terminal Upon acquiring the halt instruction, the vehicle control unit 11 causes the work vehicle 10 to stop working and traveling.

The reception processing unit 216 also accepts operation to resume driving the work vehicle 10 (resumption instruction operation). For example, in the case where the operator performs the resumption instruction operation on the operation display unit 23, the reception processing unit 216 accepts the resumption instruction operation. In response to that the reception processing unit 216 accepts the resumption instruction operation, the output processing unit 215 outputs the resumption instruction to the work vehicle 10. This allows the vehicle control unit 11 (resumption processing unit 115) of the work vehicle 10 to acquire the resumption instruction from the operation terminal Upon acquiring the resumption instruction, the vehicle control unit 11 causes the work vehicle 10 to resume working and traveling.

The reception processing unit 216 may be configured such that when the work of the work vehicle 10 is resumed, the operator can set (select) in advance whether or not to perform a process to return the work vehicle 10 to the resumption position. For example, the reception processing unit 216 displays on the setting screen a first selection button for performing the process to return the work vehicle 10 to the resumption position when causing the work vehicle 10 to resume working, and a second selection button for not performing the process to return the work vehicle 10 to the resumption position when causing the work vehicle 10 to resume working, and accepts the operator's selection operation. If the operator selects the first selection button on the aforementioned setting screen, the vehicle control unit 11 of the work vehicle 10 performs the process to return the work vehicle 10 to the resumption position. On the other hand, if the operator selects the second selection button on the aforementioned setting screen, the vehicle control unit 11 of the work vehicle 10 performs the process to resume working by the work vehicle 10 from the vehicle stop position Pa2.

The operation terminal 20 may be able to access a Web site (an agricultural support site) of an agricultural support service provided by a server (not shown) via the communication network N1. In this case, the operation terminal 20 can function as an operation terminal for the server by executing a browser program by the operation controller 21. The server includes the abovementioned processing units to execute each of the processes.

As another embodiment, each function of the vehicle control unit 11 described above may be included in the operation controller 21 of the operation terminal 20.

Autonomous Travel Process

An example of an autonomous travel process executed by the vehicle control unit 11 is described below with reference to FIG. 8. For example, the autonomous travel process is initiated by the vehicle control unit 11 when the work vehicle 10 starts driving autonomously.

It should be noted that the present invention may be understood as an invention of an autonomous travel method in which the vehicle control unit 11 executes a part or all of the autonomous travel process, or an invention of an autonomous travel program for causing the vehicle control unit 11 to execute a part or all of the autonomous travel method. In addition, one or more processors may execute the autonomous travel process.

If the work vehicle 10 starts traveling autonomously along the travel route Ra, the vehicle control unit 11 acquires position information (current position P1) of the work vehicle 10.

In step S1, the vehicle control unit 11 determines whether or not a halt instruction of the work is acquired. The vehicle control unit 11 acquires the aforementioned halt instruction when the operator performs operation of the halt instruction, when an obstacle detection sensor detects an obstacle, when the work vehicle 10 deviates from the travel route Ra, when the communication of the work vehicle 10 is interrupted, etc., for example. Upon acquiring the halt instruction, the vehicle control unit 11 acquires a position of the work vehicle 10 at the time when the halt instruction is acquired (halt instruction position Pa1). The vehicle control unit 11 then registers the halt instruction position Pa1 in the position information D1 (see FIG. 4). If the vehicle control unit 11 acquires the halt instruction (S1: Yes), the process proceeds to step S2. If the vehicle control unit 11 does not acquire the halt instruction (S1: No), the process proceeds to step S10.

In step S2, the vehicle control unit 11 executes the halt process to stop working and traveling by the work vehicle 10. Specifically, the vehicle control unit 11 causes the work machine 14 to stop working by stopping the PTO shaft drive as well as causes the work vehicle 10 to stop traveling by braking the rotation of the front wheels 132 and the rear wheels 133 using an electromagnetic brake.

Next, in step S3, the vehicle control unit 11 determines whether or not the work vehicle 10 stops. For example, the vehicle control unit 11 determines whether the work vehicle 10 stops or not based on change of position information of the work vehicle 10, a state of rotation of the front wheels 132 and rear wheels 133, etc. If the work vehicle 10 stops (S3: Yes), the process proceeds to step S4. The vehicle control unit 11 waits until the work vehicle 10 stops (S3: No). If determining that the work vehicle 10 stops, the vehicle control unit 11 acquires a position of the work vehicle 10 at that time (vehicle stop position Pa2). The vehicle control unit 11 then registers the vehicle stop position Pa2 in the position information D1 (see FIG. 4). The work vehicle 10 travels for a predetermined distance L2 from the halt instruction position Pa1 to the vehicle stop position Pa2 with the work being stopped (see FIG. 5B).

In step S4, the vehicle control unit 11 determines whether or not a resumption instruction to resume working and traveling by the work vehicle 10 is acquired. For example, in the case where the operator performs to issue a resumption instruction on the operation terminal 20, the vehicle control unit 11 acquires the resumption instruction from the operation terminal 20. If the vehicle control unit 11 acquires the resumption instruction (S4: Yes), the process proceeds to step S5. The vehicle control unit 11 waits until the halt instruction is acquired (S4: No).

In step S5, the vehicle control unit 11 determines whether or not there is a non-worked region in the travel route from the halt instruction position Pa1 to the vehicle stop position Pa2. Specifically, in the case where at least one of the halt instruction position Pa1 and the vehicle stop position Pa2 is located in the work region, the vehicle control unit 11 determines that there is the non-worked region.

For example, in the case where the halt instruction position Pa1 and the vehicle stop position Pa2 are located in the work region, the vehicle control unit 11 determines that there is the non-worked region because the work vehicle 10 travels for a distance from the halt instruction position Pa1 and the vehicle stop position Pa2 (predetermined distance L2) without working. For example, if the halt instruction position Pa1 and the vehicle stop position Pa2 are located on a route necessary to be worked among the travel routes Ra, the vehicle control unit 11 determines that there is the non-worked region because an unworked portion occurs on that route. For example, as shown in FIG. 6, in the case where the halt instruction position Pa1 is located in the work region F2 and the vehicle stop position Pa2 is located in the non-worked region F1, or as shown in FIG. 7, in the case where the halt instruction position Pa1 is located in the non-worked region F1 and the vehicle stop position Pa2 is located in the work region F2, the vehicle control unit 11 determines that there is the non-worked region because the work vehicle 10 travels without working within the work region F2 included in a distance (predetermined distance L2) from the halt instruction position Pa1 to the vehicle stop position Pa2. In contrast, in the case where both the halt instruction position Pa1 and the vehicle stop position Pa2 are located in the non-worked region F1, the vehicle control unit 11 determines that there is no non-worked region because it is unnecessary to be worked by the work vehicle 10. For example, in the case where the halt instruction position Pa1 and the vehicle stop position Pa2 are located on a route unnecessary to be worked among the travel routes Ra, the vehicle control unit 11 determines that there is no non-worked region.

If the vehicle control unit 11 determines that there is the non-worked region (S5: Yes), the process proceeds to step S6. On the other hand, if the vehicle control unit 11 determines that there is no non-worked region (S5: No), the process proceeds to step S9.

In step S6, the vehicle control unit 11 calculates a resumption position where the work vehicle 10 resumes working based on the halt instruction position Pa1 and the vehicle stop position Pa2 (see FIG. 4). For example, as shown in FIG. 5C, the vehicle control unit 11 calculates the intersection point Pb1 as the resumption position, which is the intersection point of an orthogonal line La2 that is orthogonal to a straight line La1 passing through the halt instruction position Pa1 and the vehicle stop position Pa2 as well as passes through the halt instruction position Pa1, and a straight line indicating the travel route Ra.

In step S7, the vehicle control unit 11 moves the work vehicle 10 to the resumption position. For example, the vehicle control unit 11 retreats the work vehicle along the route Rb (retreat route) from the vehicle stop position Pa2 to the resumption position Pb1, as shown in FIG. 5C.

In step S8, the vehicle control unit 11 determines whether or not the work vehicle 10 reaches the resumption position. If the work vehicle 10 reaches the resumption position (S8: Yes), the process proceeds to step S9. The vehicle control unit 11 continues a traveling process (retreat travel) until the work vehicle 10 reaches to the resumption position (S8: No).

In step S9, the vehicle control unit 11 causes the work vehicle 10 to resume working and traveling. Specifically, the vehicle control unit 11 causes the work vehicle to travel forward along the travel route Ra of the work vehicle 10 as well as causes the work machine 14 to resume working (see FIG. 5D). In step S5, if the vehicle control unit 11 determines that there is no non-worked region, the vehicle control unit 11 causes the work vehicle 10 to resume working and traveling from the vehicle stop position Pa2.

In step S10, the vehicle control unit 11 determines whether or not the work vehicle 10 finishes the work. In the case where the work vehicle 10 reaches the work end position G, the vehicle control unit 11 determines that the work is finished. The vehicle control unit 11 repeats the processes of steps S1 to S9 until the work vehicle 10 finishes the work (S10: No).

As explained above, the autonomous travel system 1 according to the present embodiment acquires position information of the work vehicle 10 and stops working and traveling by the work vehicle 10 when a halt instruction for work by the work vehicle 10 is acquired. The autonomous travel system 1 calculates the resumption position where the work vehicle 10 resumes working based on the halt instruction position Pa1 which indicates the position where the halt instruction is acquired and the vehicle stop position Pa2 which indicates the position where the work vehicle 10 is stopped, and moves the work vehicle 10 to the resumption position to resume working. This makes it possible to prevent the non-worked region corresponding to the predetermined distance L2 from occurring even if the work vehicle 10 travels the predetermined distance (predetermined distance L2 shown in FIG. 5B) since the work vehicle 10 stops working until the work vehicle 10 is stopped because the work vehicle returns to a position where the work vehicle 10 stops working (resumption position) before the vehicle stop position Pa2 and resumes traveling and working from there.

Figure 9:
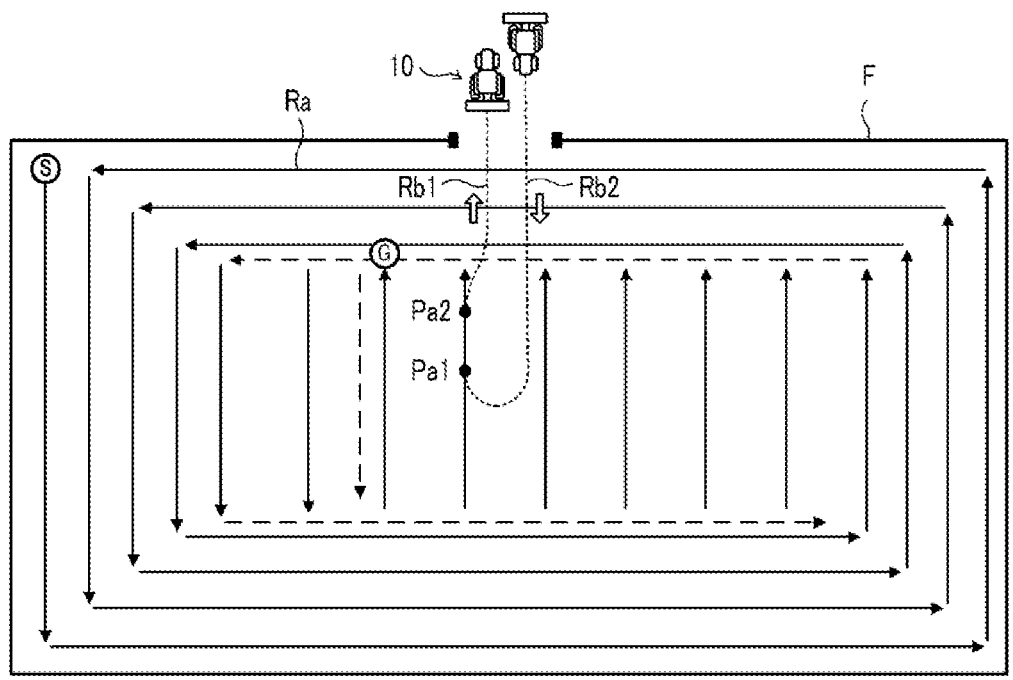
FIG. 9 is a diagram illustrating another example of the travel route of the work vehicle according to the embodiment of the present invention.

In the embodiment described above, when acquiring the halt instruction, the work vehicle 10 stops at the vehicle stop position Pa2, and when acquiring the resumption instruction at the vehicle stop position Pa2, the work vehicle 10 retreats from the vehicle stop position Pa2 to the resumption position (see FIG. 5C, etc.). In another embodiment, after stopping at the vehicle stop position Pa2 by acquiring the halt instruction, the work vehicle 10 may travel to the outside of the field F as shown in FIG. 9. Upon acquiring the halt instruction, the work vehicle 10 may travel to the outside of the field F without stopping. For example, in an event where fertilizer for application runs out during the work, the work vehicle 10 suspends the work and travels to the outside of the field F along a route Rb1 to refile the fertilizer. When resuming working, the work vehicle 10 travels forward from the outside of the field F to the resumption position (halt instruction position Pa1) along a route Rb2. Then, the work vehicle 10 resumes working and traveling along the travel route Ra from the resumption instruction (halt instruction position Pa1).

The invention claimed is:

1. An autonomous travel method comprising:
  acquiring position information of a work vehicle;
  acquiring a halt instruction for work by the work vehicle;
  stopping working and traveling by the work vehicle when the halt instruction is acquired; and
  moving the work vehicle to a resumption position where the work vehicle resumes the work that is specified based on a halt instruction position indicating a position where the halt instruction is acquired and a vehicle stop position indicating a position where the work vehicle is stopped, and causing the work vehicle to resume the work, wherein the vehicle stop position is different from the halt instruction position.

2. The autonomous travel method according to claim 1, wherein
  the work vehicle is moved to the halt instruction position specified as the resumption position to resume the work.

3. The autonomous travel method according to claim 2, wherein the work vehicle is retreated from the vehicle stop position to the halt instruction position.

4. The autonomous travel method according to claim 1, wherein
the work vehicle is moved, to resume the work, to the resumption position that is an intersection point of an orthogonal line that is orthogonal to a straight line passing through the halt instruction position and the vehicle stop position and that passes through the halt instruction position, and a straight line indicating a travel route set in advance.

5. The autonomous travel method according to claim 4, wherein
the work vehicle is retreated from the vehicle stop position to the resumption position.

6. The autonomous travel method according to claim 1, wherein
the work vehicle is moved to the resumption position to resume the work when at least one of the halt instruction position and the vehicle stop position is located in a work region.

7. The autonomous travel method according to claim 1, wherein
when the halt instruction position and the vehicle stop position are each located in a non-worked region, moving by the work vehicle is resumed from the vehicle stop position.

8. The autonomous travel method according to claim 1, wherein
when the halt instruction position is located in a non-worked region and the vehicle stop position is located in a work region, the work vehicle is moved, to resume the work, to the resumption position that is an end on a travel route in the work region.

9. The autonomous travel method according to claim 1, wherein
operation to set in advance whether or not to execute a process to move the work vehicle to the resumption position to resume the work is accepted.

10. An autonomous travel system comprising:
a position acquisition processing unit to acquire position information of a work vehicle;
a halt acquisition processing unit to acquire a halt instruction for work by the work vehicle;
a halt processing unit to stop working and traveling by the work vehicle when the halt acquisition processing unit acquires the halt instruction; and a resumption processing unit to move the work vehicle to a resumption position where the work vehicle resumes the work that is specified based on a halt instruction position indicating a position where the halt instruction is acquired and a vehicle stop position indicating a position where the work vehicle is stopped, and to cause the work vehicle to resume the work, wherein the vehicle stop position is different from the halt instruction position.

11. A non-transitory computer readable medium having stored thereon an autonomous travel program for causing one or more processors to execute a procedure comprising:
acquiring position information of a work vehicle;
acquiring a halt instruction for work by the work vehicle;
stopping working and traveling by the work vehicle when the halt instruction is acquired; and
moving the work vehicle to a resumption position where the work vehicle resumes the work that is specified based on a halt instruction position indicating a position where the halt instruction is acquired and a vehicle stop position indicating a position where the work vehicle is stopped, and causing the work vehicle to resume the work, wherein the vehicle stop position is different from the halt instruction position.

* * * * *